(12) United States Patent
Matsumoto

(10) Patent No.: US 9,475,658 B2
(45) Date of Patent: Oct. 25, 2016

(54) STOP DEVICE AND AUXILIARY STOP UNIT

(71) Applicant: HIRATA CORPORATION, Shinagawa-ku (JP)

(72) Inventor: Bungo Matsumoto, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 0 days.

(21) Appl. No.: 14/604,799

(22) Filed: Jan. 26, 2015

(65) Prior Publication Data
US 2015/0225184 A1 Aug. 13, 2015

(30) Foreign Application Priority Data

Feb. 10, 2014 (JP) ................................. 2014-023728

(51) Int. Cl.
*B65G 47/29* (2006.01)
*B65G 47/88* (2006.01)

(52) U.S. Cl.
CPC ........... *B65G 47/8823* (2013.01); *B65G 47/29* (2013.01)

(58) Field of Classification Search
None
See application file for complete search history.

(56) References Cited

U.S. PATENT DOCUMENTS

| | | | |
|---|---|---|---|
| 4,219,114 A * | 8/1980 | Kovacs | B65G 47/8823 193/35 A |
| 5,211,276 A | 5/1993 | Clopton | |
| 6,164,430 A | 12/2000 | Nishimura | |
| 7,513,355 B2 | 4/2009 | Unterhuber | |
| 8,376,122 B2 | 2/2013 | Matsumoto | |
| 8,770,383 B2 | 7/2014 | Matsumoto | |
| 9,090,409 B2 | 7/2015 | Matsumoto | |

FOREIGN PATENT DOCUMENTS

| | | |
|---|---|---|
| CN | 101152929 A | 4/2008 |
| CN | 102596767 A | 7/2012 |
| DE | 112012001363 T5 | 12/2013 |
| EP | 1522383 A2 | 4/2005 |
| JP | H06-16233 A | 1/1994 |
| JP | H06-64744 A | 3/1994 |
| JP | 11-227937 A | 8/1999 |
| KR | 10-2013-0119974 A | 11/2013 |
| WO | WO 2012/127867 A1 | 9/2012 |

OTHER PUBLICATIONS

Office Action dated Jun. 16, 2016 issued in the corresponding German Patent Application No. 10 2015 001 576.1 and English translation (12 pages).
Office Action dated Jun. 27, 2016 issued in the corresponding Chinese Patent Application No. 201510069372.4 (6 pages).
Korean Office Action dated Aug. 19, 2016 issued in the corresponding Korean Patent Application No. 10-2015-0017473 (7 pages).

* cited by examiner

*Primary Examiner* — Kavel Singh
(74) *Attorney, Agent, or Firm* — Buchanan Ingersoll & Rooney PC

(57) ABSTRACT

This invention provides a stop device that abuts against a work during conveyance and stops the work. The stop device includes a stop lever stopping the work at a predetermined stop position, a movable unit supporting the stop lever so as to pivot the stop lever in a predetermined range, a biasing unit biasing the stop lever toward an upstream side, a driving unit displacing the movable unit between a working position and a retraction position, and an auxiliary stop unit arranged in the movable unit. The auxiliary stop unit includes a work abutment portion at the same position as a conveyance stop position where the stop lever stops conveyance of the work, or at a position on the downstream side in the conveyance direction from the conveyance stop position.

5 Claims, 13 Drawing Sheets

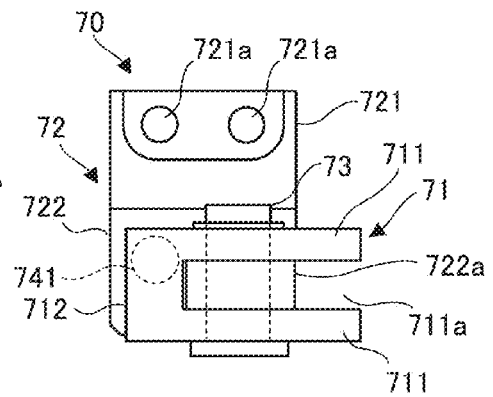
FIG. 4A
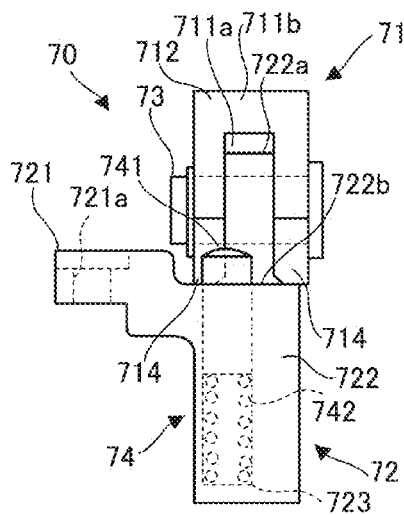
FIG. 4B
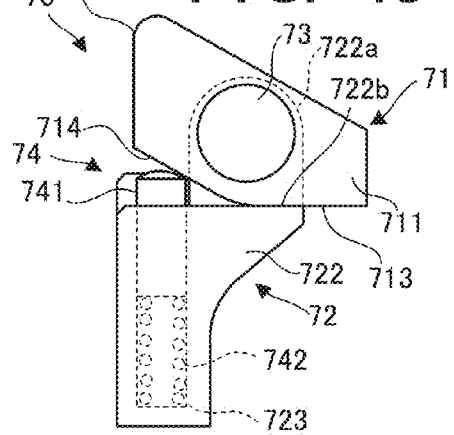
FIG. 4C
FIG. 4D

STOP DEVICE AND AUXILIARY STOP UNIT

BACKGROUND OF THE INVENTION

1. Field of the Invention

The present invention relates to a stop device that abuts against a work during conveyance and stops the work.

2. Description of the Related Art

There is known a stop device that stops, at a predetermined position, a work conveyed on a conveyance device such as a roller conveyor. The stop device stops a work or cancels the stop by advancing, onto the conveyance device, an abutment portion such as a roller that abuts against a work, or retracting the abutment portion from the conveyance device. In order to relax a shock when a work abuts against the abutment portion, there is proposed a stop device in which the abutment portion is pivotally arranged and a mechanism for biasing the abutment portion to the upstream side is arranged (International Publication No. 2012/127867 and Japanese Patent Laid-Open No. 11-227937). The abutment portion pivots to a stop position from a position on the upstream side slightly from the stop position.

In some cases, a conveyance form is employed, in which a work is stopped, then is raised and processed, and is lowered again to a stop position.

However, when the work is raised, the abutment portion is pivoted to a position on the upstream side slightly from the stop position by the biasing force of a biasing mechanism. Since the abutment portion that stops a work is not located at the stop position upon lowering the work again to the stop position, the work may not be stopped and be conveyed.

SUMMARY OF THE INVENTION

It is an object of the present invention to prevent conveyance of a work when the work is stopped, then raised, and lowered again to a stop position.

According to the present invention, there is provided a stop device that abuts against a work during conveyance and stops the work, comprising: a stop lever configured to abut against the work during conveyance and be able to stop the work at a predetermined stop position; a movable unit configured to support the stop lever so as to be able to pivot the stop lever in a predetermined range toward a downstream side in a conveyance direction of the work; a biasing unit configured to bias the stop lever toward an upstream side in the conveyance direction; a driving unit configured to be able to displace the movable unit between a working position where the stop lever can abut against the work, and a retraction position where the stop lever cannot abut against the work; and an auxiliary stop unit arranged in the movable unit, wherein the auxiliary stop unit includes a work abutment portion at the same position as a conveyance stop position where the stop lever stops conveyance of the work, or at a position on the downstream side in the conveyance direction from the conveyance stop position.

According to the present invention, there is provided an auxiliary stop unit that can be attached to a stop device which abuts against a work during conveyance and stops the work, the stop device including: a stop lever configured to abut against the work during conveyance and be able to stop the work at a predetermined stop position; a movable unit configured to support the stop lever so as to be able to pivot the stop lever in a predetermined range toward a downstream side in a conveyance direction of the work; a biasing unit configured to bias the stop lever toward an upstream side in the conveyance direction; and a driving unit configured to be able to displace the movable unit between a working position where the stop lever can abut against the work, and a retraction position where the stop lever cannot abut against the work, wherein the auxiliary stop unit is arranged in the movable unit, and the auxiliary stop unit includes a work abutment portion at the same position as a conveyance stop position where the stop lever stops conveyance of the work, or at a position on the downstream side in the conveyance direction from the conveyance stop position.

Further features of the present invention will become apparent from the following description of exemplary embodiments (with reference to the attached drawings).

BRIEF DESCRIPTION OF THE DRAWINGS

FIGS. 4A to 4D are explanatory views of an auxiliary stop unit;

DESCRIPTION OF THE EMBODIMENTS

Figure 1:
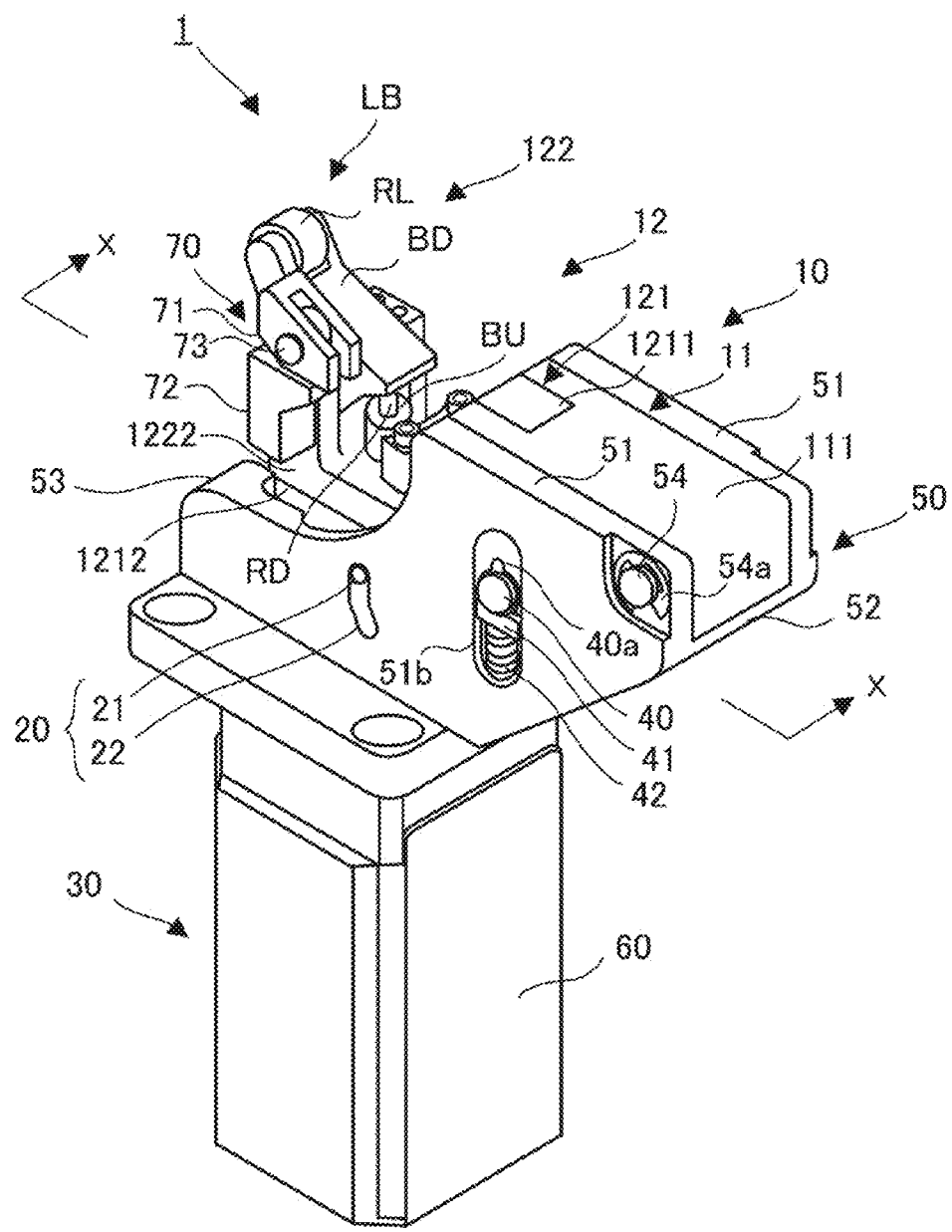
FIG. 1 is a perspective view of a stop device according to an embodiment of the present invention.
Figure 2:
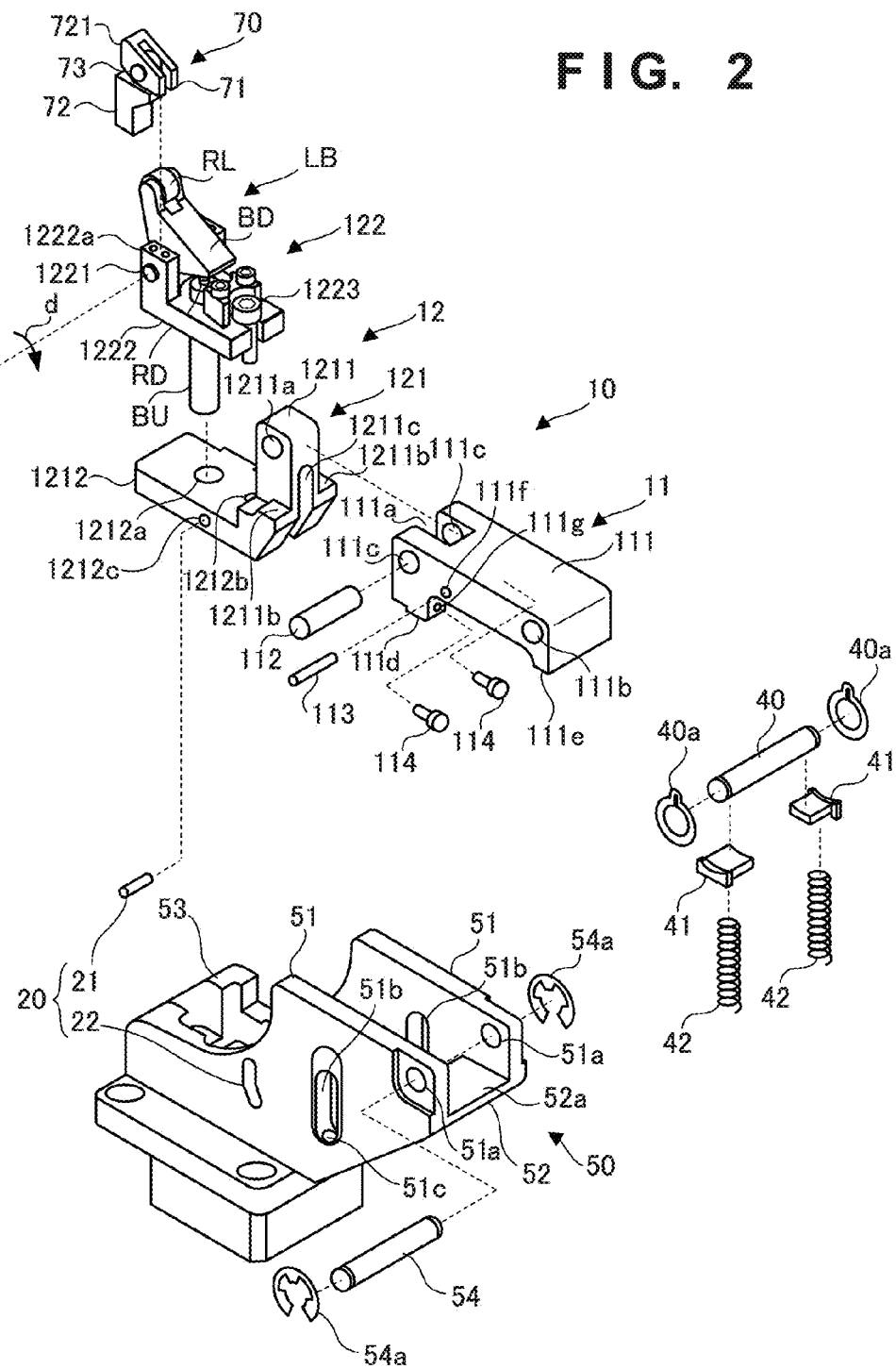
FIG. 2 is an exploded perspective view of the stop device in FIG. 1.
Figure 3:
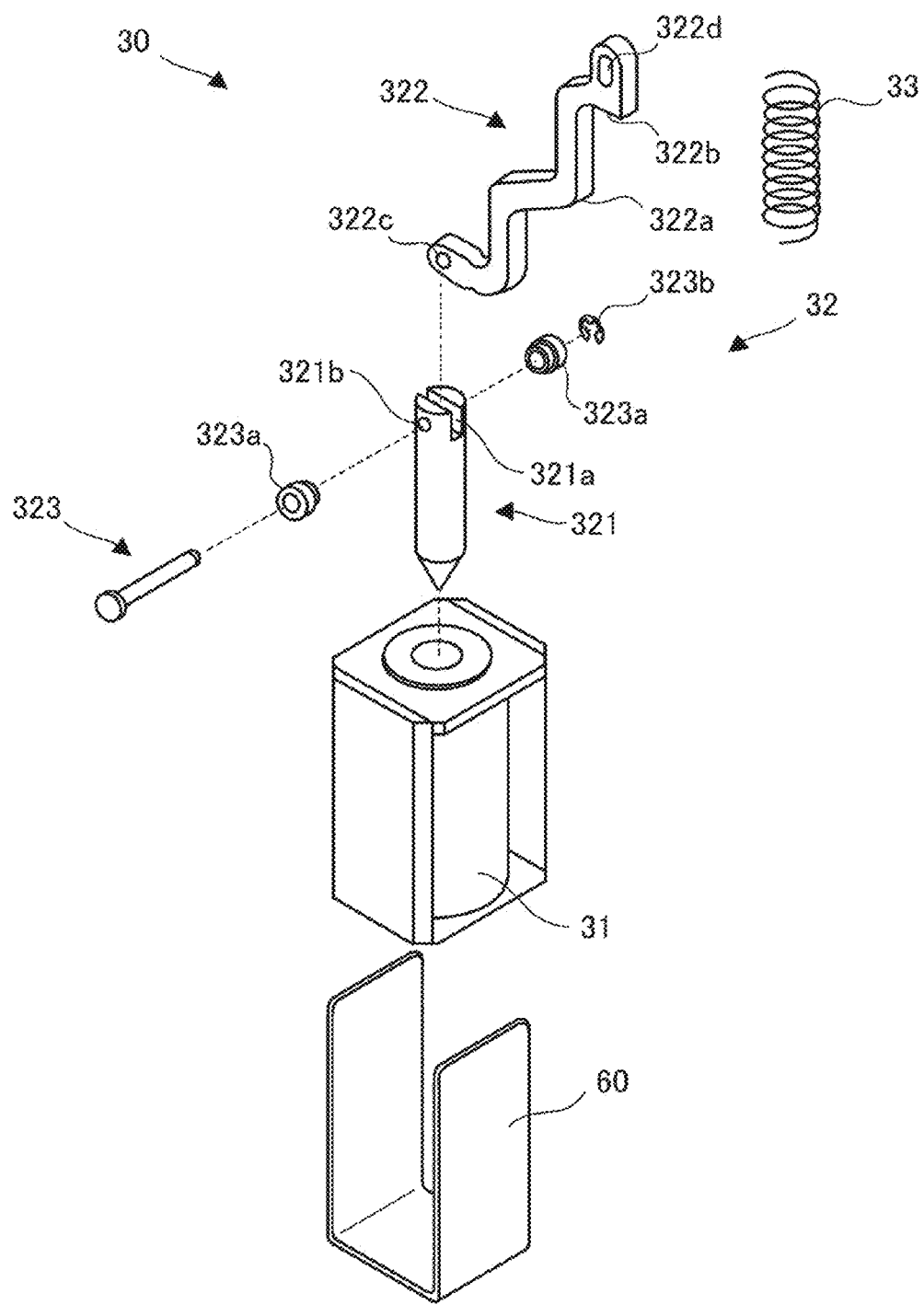
FIG. 3 is an exploded perspective view of the stop device in FIG. 1.
Figure 5:
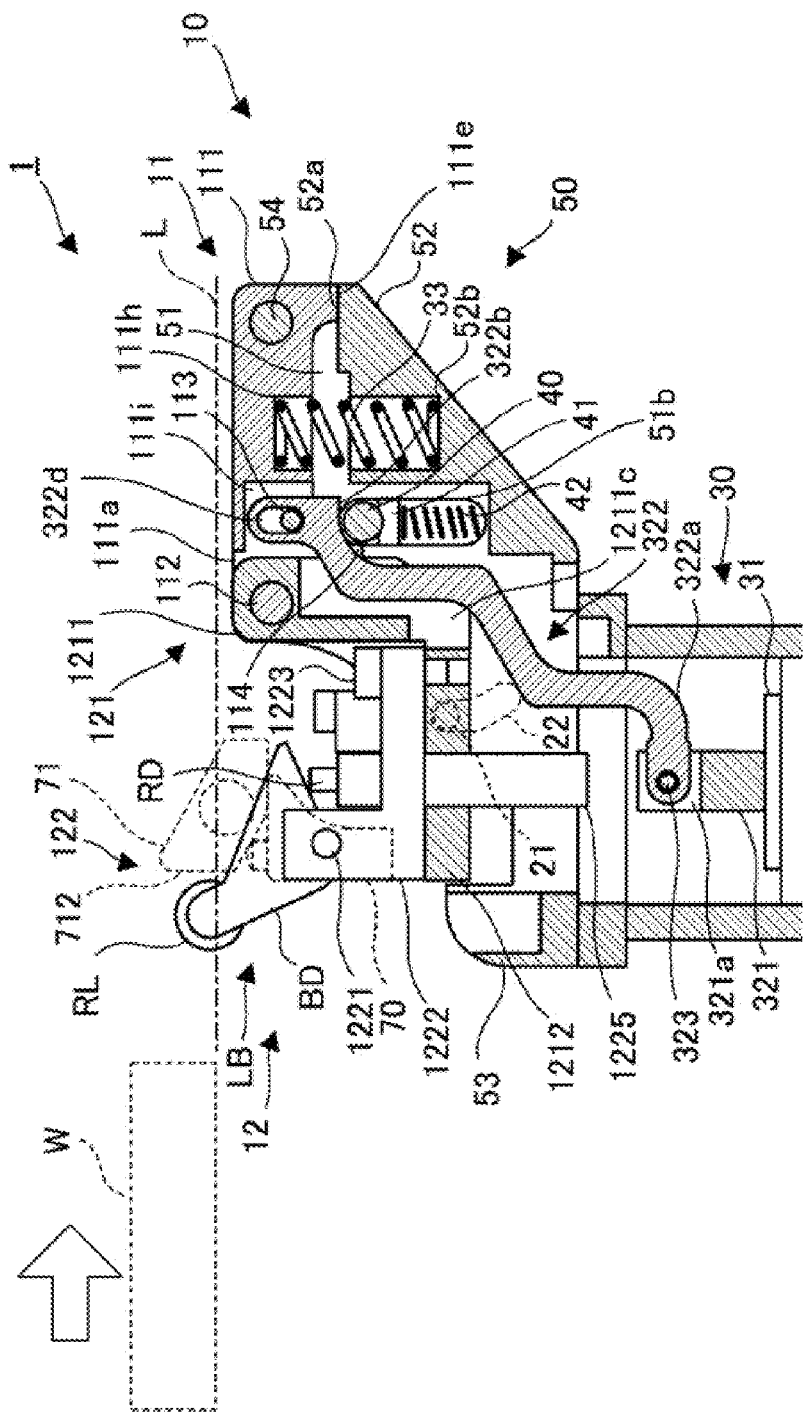
FIG. 5 is a sectional view of a main part taken along a line X-X in FIG. 1.
Figure 6:
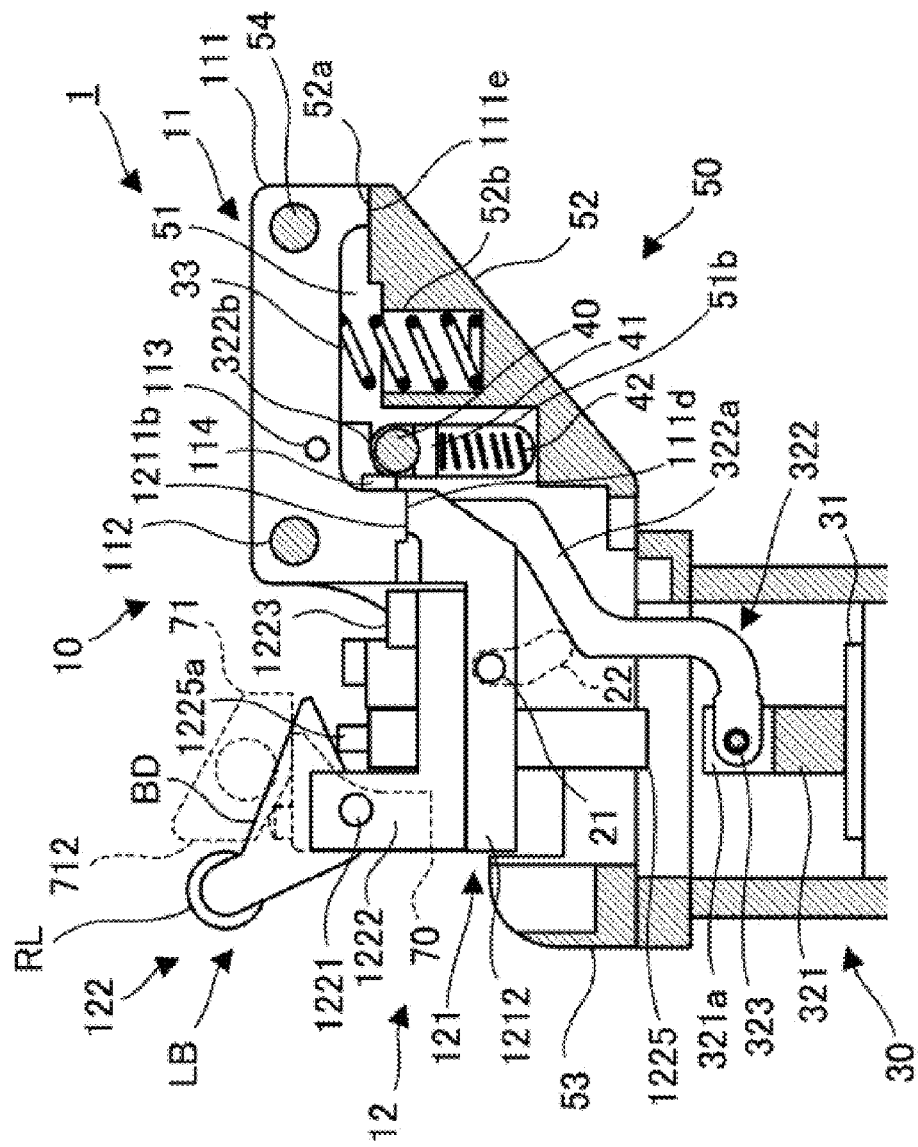
FIG. 6 is a view showing the outer appearances of a movable unit and coupling portion in FIG. 5.

A stop device 1 according to an embodiment of the present invention will be described with reference to FIGS. 1 to 6. FIG. 1 is a perspective view of the stop device 1. FIGS. 2 and 3 are exploded perspective views of the stop device 1. FIGS. 4A to 4D are explanatory views of an auxiliary stop unit 70. FIG. 5 is a sectional view of a main part taken along a line X-X in FIG. 1. FIG. 6 is a view showing the outer appearances of a movable unit 10 and coupling portion 322 in FIG. 5.

The stop device 1 is a device that abuts against a work W during conveyance and stops the conveyance of the work. The stop device 1 includes the movable unit 10, a stop lever LB, a biasing unit BU, a regulating mechanism 20, a driving unit 30, a support unit 50, and the auxiliary stop unit 70. The stop device 1 is arranged on, for example, a conveyance device such as a roller conveyor and is used to temporarily stop a work that is conveyed on the conveyance device. In the respective drawings, a chain line L indicates a conveyance surface. The conveyance surface is a position (height) at which a work is placed and conveyed by the conveyance device (not shown). The upstream side and downstream side in the work conveyance direction are based on a case in which a work is conveyed in the forward direction.

<Movable Unit 10>

The movable unit 10 includes a swing portion 11 and a movable portion 12, and the overall movable unit 10 freely pivots on a pivot shaft 54.

The swing portion 11 includes a swing member 111 extending in the horizontal direction. The swing member 111 includes a shaft hole 111b at one end portion. The pivot shaft 54 is inserted into the shaft hole 111b, and the swing portion 11 freely pivots on the pivot shaft 54 serving as the pivot center. The swing member 111 includes shaft holes 111c and a groove 111a at the other end portion. A vertical portion 1211 of a movable member 121 (to be described later) is inserted in the groove 111a.

A pivot shaft 112 is inserted in the shaft holes 111c and a shaft hole 1211a of the vertical portion 1211. The movable portion 12 is coupled to the swing portion 11 via the pivot shaft 112 so that the movable portion 12 freely pivots on the pivot shaft 112 serving as the pivot center. The pivot shaft 54 and the pivot shaft 112 are parallel to each other. As shown in FIG. 5, the pivot shaft 112 is located on the upstream side in the conveyance direction (direction indicated by an arrow in FIG. 5) of the work W with respect to the pivot shaft 54. Both the pivot shafts 54 and 112 are located below the conveyance surface L.

The swing member 111 includes, at one end portion, a regulating portion 111e that projects down and, at the other end portion, regulating portions 111d that project down. The swing member 111 includes bottomed opening portions 111h and 111i that are open in the lower surface. The opening portion 111h is a spring receiving hole in which an elastic member 33 (to be described later) is mounted.

The opening portion 111i is a hole which communicates with the groove 111a and in which the upper end portion of the coupling portion 322 (to be described later) is inserted. A pin insertion hole 111f extending through the side surfaces of the swing member 111 is formed in the side surface portion of the swing member 111. The pin insertion hole 111f communicates with the opening portion 111i, and a coupling pin 113 is inserted in the pin insertion hole 111f.

Two attachment holes 111g are formed in the inner side surfaces of the regulating portions 111d so that they are spaced apart in the widthwise direction of the swing member 111. Abutment members 114 are fixed to the attachment holes 111g, respectively. The abutment members 114 abut against a pivot regulating member 40 (to be described later). Although the swing member 111 and the abutment members 114 are separate members in this embodiment, they may be integrally constituted.

The movable portion 12 includes the movable member 121 and a support unit 122. The movable member 121 has an L shape obtained by integrating the vertical portion 1211 extending in the vertical direction, and a horizontal portion 1212 that is bent from the vertical portion 1211 and extends in the horizontal direction. The movable member 121 and the support unit 122 are fixed to each other, which will be described later.

The upper portion of the vertical portion 1211 is narrower than its lower portion, is inserted in the groove 111a of the swing member 111, and includes the shaft hole 1211a in which the pivot shaft 112 is inserted. Regulating portions 1211b are formed on two sides at the lower portion of the vertical portion 1211.

As shown in FIG. 6, the regulating portions 1211b of the vertical portion 1211 and the regulating portions 111d of the swing member 111 abut against each other to regulate the pivot range of the movable portion 12 with respect to the swing portion 11. In this embodiment, counterclockwise rotation of the movable portion 12 on the pivot shaft 112 over the position in FIG. 6 with respect to the swing portion 11 is regulated. In this embodiment, the movable portion 12 pivots on the pivot shaft 112 with respect to the swing portion 11 along with pivoting of the movable unit 10 on the pivot shaft 54, which will be described later. At this time, the regulating portions 1211b and 111d regulate pivoting of the movable portion 12 inside (counterclockwise direction) from the right side surface (surface to which the abutment member 114 is attached) of the regulating portion 111d. This can prevent pivoting of the movable portion 12 in a direction opposite to an intended direction. Further, the interference with the driving unit 30, the pivot regulating member 40, and the like is avoided, and the motion of the movable portion 12 by the regulating mechanism 20 is assisted.

A groove 1211c is formed in the vertical portion 1211. The groove 1211c is formed to avoid the interference between the coupling portion 322 (to be described later) and the movable member 121.

The support unit 122 is mounted on the horizontal portion 1212. A through hole 1212a and screw hole 1212b that extend through the horizontal portion 1212 are formed in the upper surface of the horizontal portion 1212. A pin insertion hole 1212c that is open on one side surface is formed in this side surface of the horizontal portion 1212.

The support unit 122 includes a shaft 1221 and a support member 1222, and the shaft 1221 is inserted into a through hole (not shown) of the support member 1222. The stop lever LB is supported by the shaft 1221, and can pivot in a predetermined range toward the downstream side in the work conveyance direction. A return spring (not shown) that biases the stop lever LB in a direction (toward the downstream side in the work conveyance direction) indicated by an arrow d in FIG. 2 is interposed between the support unit 122 and the stop lever LB. The stop lever LB is pressed against the biasing unit BU.

An insertion hole (not shown) that extends through the upper and lower surfaces of the support member 1222 is formed in the support member 1222. The biasing unit BU is attached to the insertion hole. The support member 1222 has an attachment portion 1222a to which the auxiliary stop unit 70 is detachably attached. A screw hole is formed in the attachment portion 1222a. The support member 1222 has a notch in which the rod portion of the bolt 1223 is fitted. By screwing a bolt 1223 with a screw hole 1212b, the support member 1222 is fixed so that it is sandwiched between the flange portion of the bolt 1223 and the horizontal portion 1212. The support unit 122 is fixed to the movable member 121.

<Stop Lever LB>

The stop lever LB abuts against a work during conveyance, and stops it at a predetermined stop position. The stop lever LB includes a roller RL serving as a work abutment portion that abuts against a work, and a main body portion BD that supports the roller RL so that the roller RL freely rotates. The shaft 1221 is inserted in the main body portion BD, and the main body portion BD freely pivots on the shaft 1221 serving as the pivot center.

<Biasing Unit BU>

The biasing unit BU is a unit that biases the stop lever LB toward the upstream side in the work conveyance direction. The biasing unit BU is a shock absorber in this embodiment, but may be constituted by only an elastic member such as a spring. The cylinder portion (outer cylinder portion) of the biasing unit BU is inserted in the insertion hole (not shown) of the support member 1222. The biasing unit BU is fixed to the support member 1222 in a state in which a rod portion RD projects on the upper surface of the support member 1222. A portion, projecting from the lower surface of the support member 1222, of the cylinder portion of the biasing unit BU is inserted in the through hole 1212*a*.

The lower surface of the rear end portion of the main body portion BD abuts against the tip of the rod portion RD of the biasing unit BU. By the above-described return spring, the lower surface of the rear end portion of the main body portion BD always abuts against the tip of the rod portion RD. However, the return spring does not have an elastic force enough to push down the rod portion RD, and the lower surface of the rear end portion of the main body portion BD lightly touches the tip of the rod portion RD. The biasing force of the biasing unit BU is exerted by pushing down the rod portion RD, and biases the main body portion BD in a direction opposite to the direction indicated by the arrow d in FIG. 2.

<Support Unit 50>

The support unit 50 integrally includes a pair of L-shaped wall portions 51, a connecting portion 52 that connects the vertical portions (lower right side portions in FIG. 2 or right side portions in FIG. 5) of the wall portions 51, and a connecting portion 53 that connects the horizontal portions (upper left side portions in FIG. 2 or left side portions in FIG. 5) of the wall portions 51. The support unit 50 forms a frame that is open vertically.

The wall portions 51 include bearing holes 51*a* that support the pivot shaft 54. The swing member 111 is fitted between the wall portions 51. In addition, the bearing holes 51*a* and the shaft hole 111*b* are aligned, and the pivot shaft 54 is inserted into these holes. Finally, snap rings 54*a* are engaged with the two end portions of the pivot shaft 54. In this manner, the support unit 50 and the swing member 111 are assembled and engaged with each other. The overall movable unit 10 is supported by the support unit 50 so that the movable unit 10 freely pivots on the pivot shaft 54 serving as the pivot center.

The wall portions 51 include grooves 51*b* in which the pivot regulating member 40 is inserted. Each groove 51*b* has an oval shape long in the vertical direction (parallel to the moving direction of a plunger 321 to be described later), and extends through the wall portion 51 in the direction of thickness. The pivot regulating member 40 has a pin shape, is inserted into the grooves 51*b* and engaged with them, and is freely movable in the vertical direction along the grooves 51*b*. Snap rings 40*a* are mounted at the respective end portions of the pivot regulating member 40, and prevent slippage of the pivot regulating member 40.

In the respective grooves 51*b*, receiving members 41 that support the two end portions of the pivot regulating member 40 from below them, and elastic members 42 interposed between the receiving members 41 and the bottom portions of the grooves 51*b* are arranged.

Each receiving member 41 is a member that is interposed between the pivot regulating member 40 and the elastic member 42, and stably transfers the biasing force of the elastic member 42 to the pivot regulating member 40. In this embodiment, the elastic member 42 is a compression spring (coil spring), and always biases upward the pivot regulating member 40 via the receiving member 41. This biasing force is smaller than the biasing force of the elastic member 33 (to be described later). Note that the elastic member 42 is not limited to the coil spring, and another elastic member can also be employed in addition to another compression spring such as a leaf spring. Holes 51*c* are formed in the bottom portions of the respective grooves 51*b*. The lower end portions of the elastic members 42 are inserted into the holes 51*c* to stably support the elastic members 42.

A portion of the connecting portion 52 near the bearing holes 51*a* forms a horizontal surface and constitutes a pivot regulating surface 52*a*. The regulating portion 111*e* of the swing member 111 abuts against the pivot regulating surface 52*a* to prevent clockwise pivoting of the movable unit 10 (swing member 111) from the state of FIG. 4A to 4D or FIG. 5. A bottomed hole 52*b* is open midway between the bearing holes 51*a* and the grooves 51*b* in the connecting portion 52. The hole 52*b* is a spring receiving hole in which the elastic member 33 (to be described later) is inserted and mounted.

<Regulating Mechanism 20>

The regulating mechanism 20 is a mechanism that regulates the moving range of the movable portion 12 to guide pivoting of the movable portion 12 on the pivot shaft 112. By arranging the regulating mechanism 20, the movable portion 12 can be moved along an intended locus when the movable unit 10 pivots on the pivot shaft 54.

In this embodiment, the regulating mechanism 20 includes a pin 21 and a guide groove 22. The pin 21 is inserted into the pin insertion hole 1212*c* of the movable member 121, and forms a projecting portion that projects from the side surface portion of the movable member 121. The guide groove 22 is formed in one of the pair of wall portions 51.

The end portion of the pin 21 is engaged with the guide groove 22, and the movement of the movable portion 12 can be guided by the guide groove 22. In this embodiment, the pin 21 serves as an engaging portion on the side of the movable portion 12, and the guide groove 22 serves as a fixed engaging portion on the side of the wall portion 51. However, the arrangement portions of the pin and guide groove may be interchanged. In this embodiment, the guide groove 22 and the groove 51*b* can be formed using the common support unit 50. This is advantageous for shaping the guide groove 22 and the groove 51*b*, and the positional accuracy of them.

The guide groove 22 has an upper portion extending in the vertical direction, and a lower portion that is inclined down on the downstream side in the conveyance direction and extends. In other words, the guide groove 22 is formed into a V shape that is gently bent toward the downstream side in the conveyance direction. When the swing portion 11 of the movable unit 10 is pivoted counterclockwise on the pivot shaft 54 from the state of FIGS. 4A to 4D or FIG. 5, the movable portion 12 moves down almost straight at the initial stage, and then moves down on the downstream side in the conveyance direction. The moving direction of the movable portion 12 is decided by the groove shape (bent shape) of the guide groove 22.

<Driving Unit 30>

The driving unit 30 displaces the movable unit 10 by pivoting it on the pivot shaft 54. The driving unit 30 includes the elastic member 33. In this embodiment, the elastic member 33 is a compression spring (coil spring), and is loaded between the opening portion 111*h* of the swing member 111 and the hole 52*b* of the connecting portion 52. The elastic member 33 always biases upward the movable unit 10, and maintains the state of FIGS. 5 and 6 (state in which the regulating portion 111*e* abuts against the pivot regulating surface 52*a* to regulate pivoting of the swing member 111). Note that the elastic member 33 is not limited to the coil spring, and another elastic member can also be employed in addition to another compression spring such as a leaf spring.

The driving unit 30 includes an electric driving portion 31 surrounded by a case 60, and a movable portion 32 that is moved by the driving portion 31. The movable portion 32 includes the plunger 321, the coupling portion 322 that couples the plunger 321 and the movable unit 10, and a coupling pin 323.

In this embodiment, the driving portion 31 and the plunger 321 constitute a pull solenoid, and exerts a driving force only in a direction (downward direction) in which the plunger 321 is pulled into the cylinder of the driving portion 31 by energization to the cylindrical driving portion 31 (electromagnet). That is, the pull solenoid does not exert a driving force in a direction (upward direction) in which the plunger 321 is pushed out of the cylinder of the driving portion 31. This embodiment adopts the pull solenoid, but another electric driving actuator such as a motor is also available. Needless to say, the same effects can also be obtained even by using a well-known actuator (for example, air cylinder) other than an electric actuator, instead of the electrically driving actuator. However, when the pull solenoid is employed, the device can be downsized.

A slit (recessed portion) 321a in which one end portion (lower end portion) of the coupling portion 322 is engaged and inserted is formed at the upper end portion of the plunger 321. A pin insertion hole 321b that extends through the plunger 321 in the radial direction (direction perpendicular to the slit 321a) is formed in the outer surface of the upper end portion of the plunger 321.

The coupling portion 322 includes a main body portion 322a. A circular coupling hole 322c in which the coupling pin 323 is inserted is formed at the lower portion of the main body portion 322a. The coupling portion 322 is inserted in the slit 321a. In addition, the pin insertion hole 321b and the coupling hole 322c are aligned, and the coupling pin 323 is inserted into these holes to engage the plunger 321 and the coupling portion 322. Note that a snap ring 323b is engaged with the end portion of the coupling pin 323 to prevent slippage of the coupling pin 323. Members 323a are spacers.

With this structure, the coupling portion 322 is coupled to the plunger 321 so that the coupling portion 322 freely pivots on the coupling pin 323 serving as the pivot center. In this embodiment, the main body portion 322a is bent at multiple stages so as to prevent the interference of the main body portion 322a with the surrounding arrangement while downsizing the stop device 1. However, the shape of the main body portion 322a can be arbitrarily set. For example, the main body portion 322a may be straight as long as it does not interfere with the surrounding arrangement.

A coupling hole 322d in which the coupling pin 113 serving as a shaft body is inserted is formed at the upper portion of the main body portion 322a. The coupling hole 322d is a long hole that is long in the vertical direction. The upper end portion of the coupling portion 322 is inserted in the opening portion 111i of the swing member 111, and the coupling pin 113 is inserted in the pin insertion hole 111f of the swing member 111 and the coupling hole 322d, thereby engaging the coupling portion 322 and the swing member 111. Since the coupling hole 322d is a long hole, the coupling portion 322 and the swing member 111 are fitted with a predetermined play (loosely fitted).

An abutment portion 322b is formed below the coupling hole 322d. The abutment portion 322b abuts against the top portion of the outer surface of the pivot regulating member 40 and is engaged with the pivot regulating member 40.

In this embodiment, the coupling portion 322 is coupled to the driving unit 30 relatively on the upstream side in the conveyance direction, and coupled to the swing member 111 relatively on the downstream side in the conveyance direction. This coupling structure implements a structure in which the driving unit 30 is arranged below the roller RL that abuts against a work. As a result, there can be provided a pivot type stop device while arranging the driving source at the same location as that in a conventional stop device of a type in which an abutment portion abutting against a work is reciprocated straight.

<Auxiliary Stop Unit 70>

The arrangement of the auxiliary stop unit 70 will be explained mainly with reference to FIGS. 4A to 4D. FIG. 4A is a view of the auxiliary stop unit 70 when viewed from the top. FIG. 4B is a view of the auxiliary stop unit 70 when viewed from the upstream side in the work conveyance direction. FIG. 4C is a view equivalent to the right side view of the auxiliary stop unit 70 when FIG. 4B is regarded as a front view. FIG. 4D is an explanatory view of the operation of the auxiliary stop unit 70.

The auxiliary stop unit 70 is arranged to stop a work when it is difficult to stop conveyance of the work by the stop lever LB. The auxiliary stop unit 70 includes an auxiliary stop lever 71, a support member 72, a shaft 73, and a biasing unit 74.

The support member 72 includes an attachment portion 721 and a main body portion 722. The attachment portion 721 is a portion fixed to the attachment portion 1222a of the support member 1222, and attachment holes 721a in which bolts are inserted are formed. The auxiliary stop unit 70 can be fixed to the support member 1222 by inserting bolts (not shown) into the attachment holes 721a, and threadably fixing them to the screw holes of the attachment portions 1222a.

It is possible that the auxiliary stop unit 70 cannot be separated from the stop device 1. However, by constituting the auxiliary stop unit 70 to be freely detachable via the attachment portion 721, as in this embodiment, the auxiliary stop unit 70 can be mounted on the stop device 1 and used only when the auxiliary stop unit 70 is necessary. This can prevent an unnecessary increase in the number of components of the stop device 1. Also, the auxiliary stop unit 70 can be mounted and used by performing a minimum process on a stop device of this type having no auxiliary stop unit 70.

The main body portion 722 includes, at its upper portion, a support portion 722a that is a plate-like projecting portion. A through hole (not shown) is formed in the support portion 722a, and the shaft 73 is inserted in this through hole. The auxiliary stop lever 71 is constituted by a pair of plate-like side plate portions 711. The two side plate portions 711 are coupled by a coupling portion 711b and have a U shape when viewed from the top (see FIG. 4A). Through holes (not shown) are formed in the two side plate portions 711, and an opening 711a is formed between the two side plate portions 711. By inserting the support portion 722a into the opening 711a, the support portion 722a is sandwiched between the two side plate portions 711. The shaft 73 is inserted in the through hole of the support portion 722a and the through holes of the two projecting portions. The auxiliary stop lever 71 is pivoted on the shaft 73 serving as the center in the work conveyance direction with respect to the main body portion 722.

The main body portion 722 also includes an abutment surface 722b that regulates the pivot range of the auxiliary stop lever 71. An abutment surface 713 of the auxiliary stop lever 71 abuts against the abutment surface 722b to regulate further clockwise pivoting of the auxiliary stop lever 71 in FIG. 4C.

The main body portion 722 includes an accommodation hole 723 that is open in the abutment surface 722b. The biasing unit 74 is attached to the accommodation hole 723. The biasing unit 74 is a unit that always biases upward an inclined surface 714 continuous with the abutment surface 713 of the auxiliary stop lever 71. In this embodiment, the biasing unit 74 has a pin 741 and an elastic member 742. The pin 741 and the elastic member 742 are inserted in the accommodation hole 723, and the elastic member 742 is located on the bottom portion side of the accommodation hole 723. In this embodiment, the elastic member 742 is a spring having a biasing force so adjusted that the tip of the pin 741 projects from the abutment surface 722b to the upper surface. The pin 741 abuts against the inclined surface 714 and always biases it upward, and the abutment surface 713 of the auxiliary stop lever 71 is held in a state in which it always abuts against the abutment surface 722b of the main body portion 722 (see FIG. 4C).

The auxiliary stop lever 71 includes, at a portion on the upstream side in the work conveyance direction, a work abutment portion 712 that is a vertical surface continuous with the inclined surface 714. The work abutment portion 712 is a portion that abuts against a work and stops it. The work abutment portion 712 is arranged at the same position as a conveyance stop position where the stop lever LB stops conveyance of a work, or at a position on the downstream side in the conveyance direction from the conveyance stop position. In this embodiment, the work abutment portion 712 is located on the downstream side in the conveyance direction slightly from the conveyance stop position. In this embodiment, the work abutment portion 712 is constituted by one side surface of the auxiliary stop lever 71, but may be constituted by a roller such as the stop lever LB.

The operation of the auxiliary stop lever 71 will be explained with reference to FIG. 4D. The left side of FIG. 4D shows a state in which the auxiliary stop lever 71 is located at an abutment position where it abuts against a work. The right side of FIG. 4D shows a state in which the auxiliary stop lever 71 is inclined to the upstream side in the conveyance direction and located at a work passage permission position.

At the abutment position, the auxiliary stop lever 71 maximally pivots clockwise in FIG. 4D by the biasing of the biasing unit 74, and the abutment surface 713 and the abutment surface 722b abut against each other. When the movable unit 10 is located at a working position (to be described later), the abutment portion 712 is located above the work conveyance surface L. The abutment portion 712 abuts against a work conveyed from the left side in FIG. 4D and can stop the conveyance of the work.

At the work passage permission position, the auxiliary stop lever 71 pivots counterclockwise in FIG. 4D against the biasing of the biasing unit 74 by the action of an external force (for example, work conveyance force). Even when the movable unit 10 is located at the working position (to be described later), the abutment portion 712 (or the coupling portion 711b) is retracted below the work conveyance surface L. Hence, the passage of the work is permitted without stopping the traveling of the work. When the external force is released (for example, the work completely passes the work passage permission position), the auxiliary stop lever 71 returns to the abutment position by the biasing of the biasing unit 74.

In this embodiment, when a work is conveyed backward (conveyed from the right side to the left side in FIG. 4D), which will be described later, the auxiliary stop lever 71 can be pivoted to the work passage permission position so as not to stop the traveling of the work by the auxiliary stop lever 71. To only stop a work, the auxiliary stop lever 71 need not be constituted to freely pivot, and may be fixed at the abutment position.

<Example of Operation of Stop Device 1>

Figure 7:
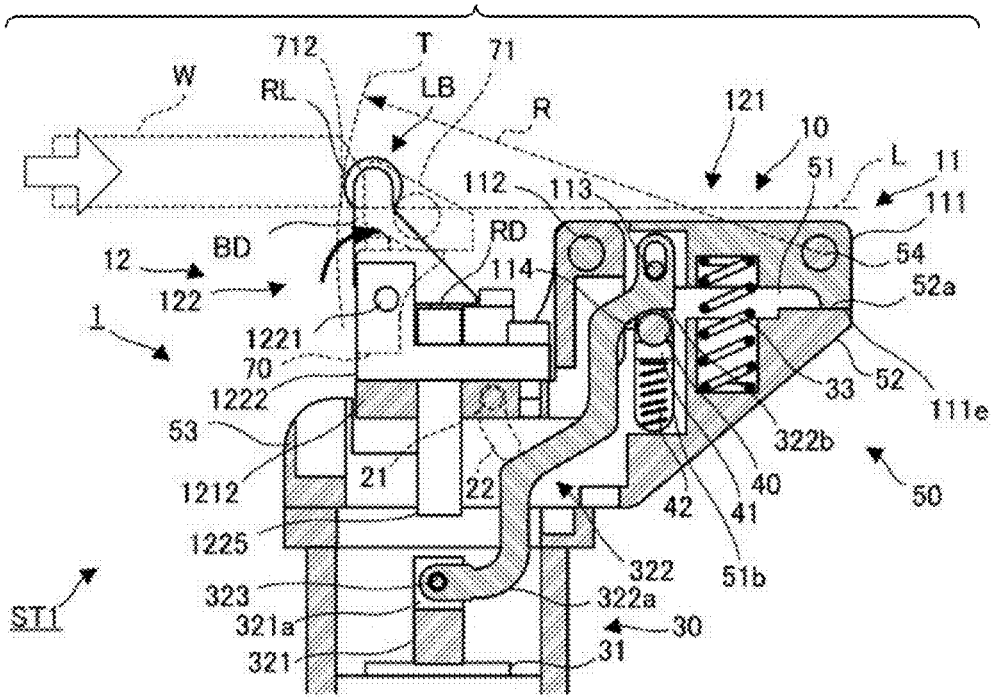
FIG. 7 is an explanatory view of the operation of the stop device in FIG. 1.
Figure 7:
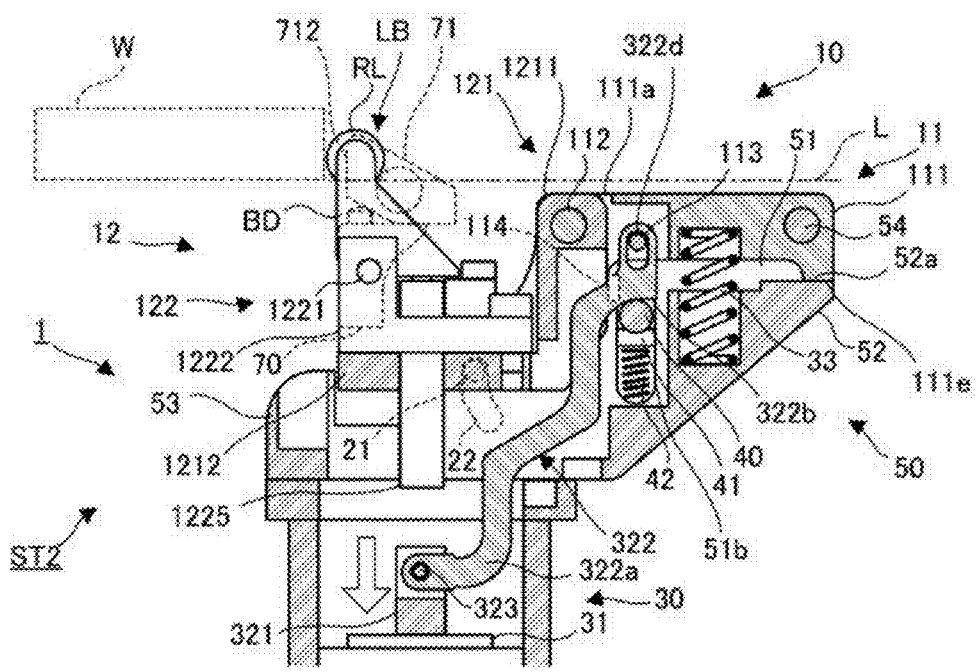
Figure 8:
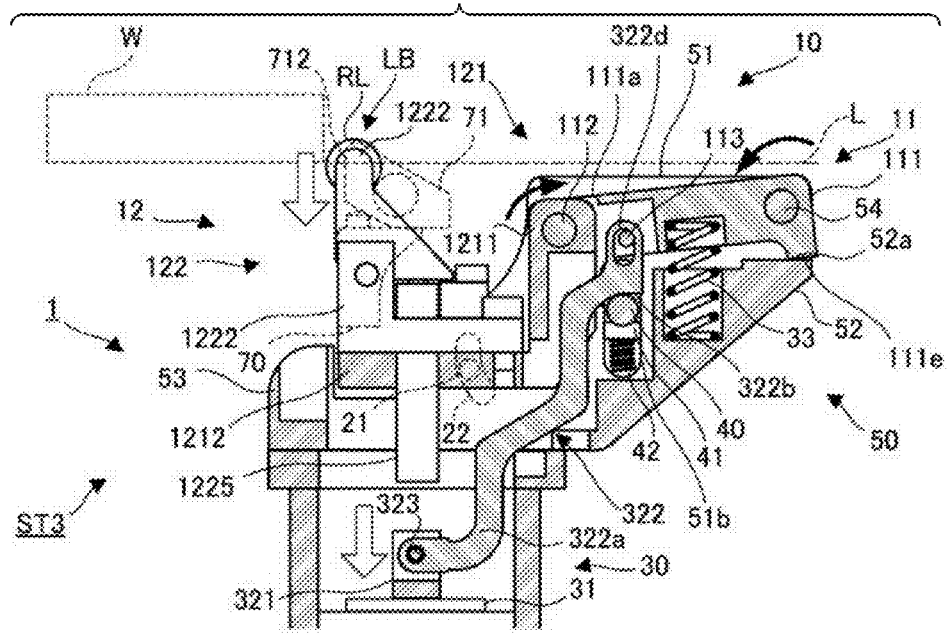
FIG. 8 is an explanatory view of the operation of the stop device in FIG. 1.
Figure 8:
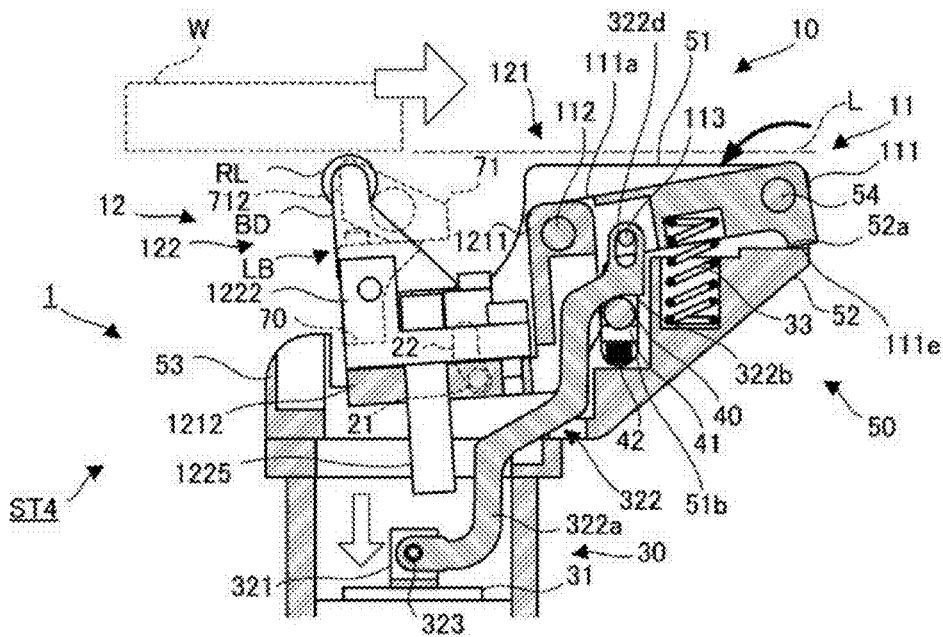

Next, an example of the operation of the stop device 1 will be explained with reference to FIGS. 5, 7, and 8. FIGS. 7 and 8 are explanatory views of the operation of the stop device 1. A work stop operation by the stop lever LB will be mainly explained.

FIG. 5 shows a state immediately before stopping the work W conveyed from the upstream side to the downstream side (from left to right in FIG. 5) in the horizontal direction. The movable unit 10 of the stop device 1 is located at the working position where the roller RL of the stop lever LB can abut against the work W. At this working position, the roller RL projects to the lower surface of the work W, that is, above the conveyance surface L.

The elastic member 33 applies a biasing force to the movable unit 10 in a direction in which the movable unit 10 is located at the working position (in FIG. 5, an upward direction which is a clockwise direction about the pivot shaft 54 serving as the center by setting the horizontal state of the swing member 111 as an upper limit). As described above, the movable unit 10 does not further pivot clockwise from the state of FIG. 5 because of the abutment between the pivot regulating surface 52a of the connecting portion 52 and the regulating portion 111e of the swing member 111.

In the state of FIG. 5, the driving portion 31 is not driven. By the biasing of the elastic member 42, the pivot regulating member 40 is located at the upper end of the groove 51b. The pivot regulating member 40 abuts against the abutment portion 322b of the coupling portion 322 and is engaged. Since the driving portion 31 is in the non-driving state, the coupling portion 322 and the plunger 321 are pushed up to their uppermost positions by the biasing of the elastic member 42 via the pivot regulating member 40, and the coupling pin 113 is located at the lowermost portion of the coupling hole 322d. In this fashion, the elastic member 42 applies a biasing force in a direction in which the pivot regulating member 40 is engaged with the coupling portion 322.

The auxiliary stop lever 71 of the auxiliary stop unit 70 is located at the abutment position.

State ST1 of FIG. 7 shows a state in which the work W abuts against the roller RL and is stopped at a predetermined conveyance stop position. In this embodiment, the main body portion BD that supports the roller RL freely pivots on the shaft 1221 serving as the pivot center. At a stage at which the work W starts abutting against the roller RL, the conveyance force of the work W does not act in a direction in which the overall movable unit 10 is pivoted, and only the main body portion BD pivots toward the downstream side in the conveyance direction of the work W, and changes to the form of state ST1. Along with the pivoting of the main body portion BD, the main body portion BD starts abutting against the tip of the rod portion RD of the biasing unit BU. The biasing unit BU absorbs the shock of a collision between the work W and the roller RL, and the pivot range of the main body portion BD is regulated to a predetermined range.

In the form of state ST1, the conveyance force of the work W acts in a direction in which the movable portion 12 is pivoted clockwise on the pivot shaft 112 serving as the pivot center. A force that pivots the swing portion 11 counterclockwise on the pivot shaft 54 serving as the pivot center acts on the swing portion 11. That is, forces that bend the movable portion 12 and the swing portion 11 act.

However, the pivot regulating member 40 and the abutment member 114 of the swing member 111 abut against each other and are engaged to regulate pivoting of the swing portion 11. Pivoting of the movable portion 12 is also regulated by abutment between the upper end portion of the guide groove 22 and the pin 21.

In this embodiment, pivoting of the swing portion 11 and movable portion 12 can be more reliably, firmly regulated without using the driving force of the driving portion 31, and the work W can be stopped at a predetermined stop position.

The auxiliary stop unit 70 continues the state in which the auxiliary stop lever 71 is located at the abutment position. As described above, the work abutment portion 712 is located on the downstream side in the conveyance direction slightly from the conveyance stop position in this embodiment. However, it is also possible to locate the work abutment portion 712 at the conveyance stop position so that even the work abutment portion 712 abuts against the work W in state ST1.

Next, a case will be explained, in which the driving portion 31 is driven to retract the roller RL below the lower surface of the work W, the movable unit 10 is pivoted to a retraction position where the roller RL of the stop lever LB cannot abut against the work W, and the work W can pass the stop device 1. In this embodiment, the driving portion 31 moves the plunger 321 in a direction in which the movable unit 10 pivots to the retraction position against the biasing of the elastic member 33.

In this embodiment, the pivot shaft 54 serving as the pivot center of the movable unit 10 is located on the downstream side in the conveyance direction from the stop position of the work W. Even if the movable unit 10 does not include the pivot shaft 112 and the movable portion 12 does not pivot with respect to the swing portion 11, the abutment point of the roller RL to the work W moves on an arcuate track T described in state ST1 of FIG. 7. Here, the arcuate track T is a virtual arc whose radius is a distance R between the abutment point of the roller RL to the work W and the shaft center of the pivot shaft 54.

When the abutment point of the roller RL to the work W moves on the arcuate track T, the roller RL (stop device 1) slightly pushes back the work W to the upstream side at the time of moving the roller RL from a contact position where the work W and the roller RL contact each other to a retraction position where they do not contact each other. An extra output of the driving portion 31 is required for the pushback force. This embodiment solves this problem because the movable portion 12 pivots with respect to the swing portion 11.

State ST2 of FIG. 7 represents an initial state in which the driving portion 31 starts driving. The plunger 321 starts moving down (starts being pulled into the driving portion 31). Since the pivot regulating member 40 is engaged with the coupling portion 322, the pivot regulating member 40 also starts moving down in synchronism with the movement of the plunger 321 and coupling portion 322.

Since the moving direction of the plunger 321 and the longitudinal direction of the groove 51b are parallel, the pivot regulating member 40 moves in a direction parallel to the moving direction of the plunger 321. When the pivot regulating member 40 moves down to a position in state ST2 of FIG. 7 (state in which the coupling pin 113 is located at the upper end of the coupling portion 322), the pivot regulating member 40 and the abutment member 114 are disengaged (do not abut against each other), canceling the engagement. The moving range of the pivot regulating member 40 when the pivot regulating member 40 and the abutment member 114 are engaged will be called a regulation region, and the moving range of the pivot regulating member 40 when they are not engaged will be called a regulation-canceled region.

As described above, the coupling hole 322d is a long hole, and the coupling hole 322d and the coupling pin 113 are loosely fitted. The length of the long hole is set so that the swing member 111 and the coupling portion 322 are not coupled and no pivoting force is applied from the driving portion 31 to the movable unit 10 until the pivot regulating member 40 escapes from the regulation region. When the pivot regulating member 40 reaches the regulation-canceled region, the upper portion of the outer surface of the coupling pin 113 is placed on the upper portion of the coupling hole 322d. Hence, the swing member 111 and the coupling portion 322 are coupled, and the pivoting force is applied from the driving portion 31 to the movable unit 10.

In this fashion, according to this embodiment, the coupling portion 322 and the swing member 111 are coupled after the movement of the plunger 321 and pivot regulating member 40. This is because, even if the pivoting force is applied from the driving portion 31 to the movable unit 10 before the regulation of pivoting of the movable unit 10 by the pivot regulating member 40 is canceled, this pivoting force is wasted, so this state is avoided.

If the plunger 321 further moves down in the state in which the movable unit 10 and the coupling portion 322 have been coupled and the pivot regulating member 40 has moved to the regulation-canceled region, the movable unit 10 pivots counterclockwise (downward) against the biasing of the elastic member 33. The stop lever LB starts lowering to the retraction position, as represented by state ST3 of FIG. 8, and reaches the retraction position, as represented by state ST4, thereby canceling the stop of the work. The auxiliary stop unit 70 is also lowered together with the stop lever LB, and the auxiliary stop lever 71 is retracted below the conveyance surface L.

When the movable unit 10 pivots to the retraction position, the movable portion 12 pivots with respect to the swing portion 11, and the movable unit 10 is bent at its middle portion (pivot shaft 112). Pivoting of the movable portion 12 on the pivot shaft 112 is guided by the regulating mechanism 20, and the movable portion 12 pivots clockwise (upward) with respect to the swing portion 11. As the movable unit 10 pivots from the working position to the retraction position, the distance between the pivot shaft 54 and the roller RL is shortened, and the abutment point between the roller RL and the work W moves inside the arcuate track T in FIG. 7.

An operation from state ST3 to state ST4 will be further explained. The swing portion 11 starts rotating counterclockwise on the pivot shaft 54 serving as the center. Along with this, the pivot shaft 112 also moves together with the swing portion 11.

The upper portion of the guide groove 22 extends in the vertical direction, and the movement of the movable member 121 to the right side in FIG. 7 is regulated via the pin 21. For this reason, the movable member 121 moves down along the guide groove 22, and starts pivoting clockwise on the pin 21 serving as the center.

As a result, the roller RL moves down while moving clockwise. That is, the roller RL moves down (lower right direction in FIG. 8) to the downstream side in the conveyance direction.

Depending on the length of the swing member 111 of the swing portion 11, the distance between the pivot shaft 112 and the pin 21, the distance between the roller RL and the pin 21, and the like, the distance by which the roller RL moves up by its clockwise movement may temporarily become larger than the distance by which the movable member 121 moves down.

Even in this case, however, the roller RL constantly moves to the downstream side in the conveyance direction. Thus, the abutment point between the roller RL and the work W moves inside the arcuate track T, and the distance between the abutment point between the roller RL and the work W, and the pivot shaft 54 becomes short.

The guide groove 22 extends with its lower portion inclined down to the downstream side in the conveyance direction. Therefore, the movable member 121 is guided via the pin 21 to the downstream side in the conveyance direction. This further promotes the down movement of the roller RL to the downstream side in the conveyance direction. By combining these two motions (guidance (horizontal movement) to the downstream side in the conveyance direction, and down movement), the roller RL can be more smoothly shifted to the retraction position.

As described above, in this embodiment, when pivoting the movable unit 10 from the working position to the retraction position, the movable portion 12 moves down almost straight and then moves down to the downstream side in the conveyance direction, and does not move in a direction in which the movable portion 12 pushes back the work W to the upstream side. That is, when pivoting the movable portion 12 from the working position to the retraction position, the force to push back the work W to the upstream side need not be considered for the pivoting force.

Therefore, as the actuator (driving portion 31) of the stop device 1, a lower-output actuator can be adopted for the driving portion 31.

Note that the shape of the guide groove 22 is arbitrary as long as the roller RL can be moved to move the abutment point between the roller RL and the work W inside the arcuate track T and shorten the distance between the pivot shaft 54 and the abutment point.

In this embodiment, the position (coupling pin 113) where the coupling portion 322 and the swing portion 11 are coupled, with respect to the pivot shaft 54, is set at a position spaced apart from the action position (opening portion 111h) where the elastic member 33 applies a biasing force to the swing portion 11. Thus, a lower-output actuator can be used for the driving portion 31 thanks to the principle of leverage, compared to a case in which the position of the coupling pin 113 with respect to the pivot shaft 54 is set closer than the action position.

When the driving portion 31 changes from state ST4 of FIG. 8 to the non-driving state, the swing portion 11 and the movable portion 12 return to the state of FIG. 5 owing to the restoring forces of the elastic members 33 and 42. If the driving portion 31 changes to the non-driving state in the state (state ST4) in which the roller RL abuts against the bottom surface of the work W, conveyance of which has restarted, the swing portion 11 and the movable portion 12 return to the state of FIG. 5 by the restoring forces of the elastic members 33 and 42 after the work W passes. As a result, the auxiliary stop unit 70 also returns to the state of FIG. 5. The stop lever LB returns to the state of FIG. 5 by the biasing of the biasing unit BU.

In this embodiment, the pivot regulating member 40 is moved in synchronism with the movement of the movable portion 32. While employing the driving portion 31 that exerts a driving force only in a single direction, unintentional pivoting of the movable unit 10 from the working position can be prevented, the movable unit 10 can be moved to the retraction position, and functions necessary for the stop device can be implemented.

<Example of Stop by Auxiliary Stop Unit 70>

Figure 9:
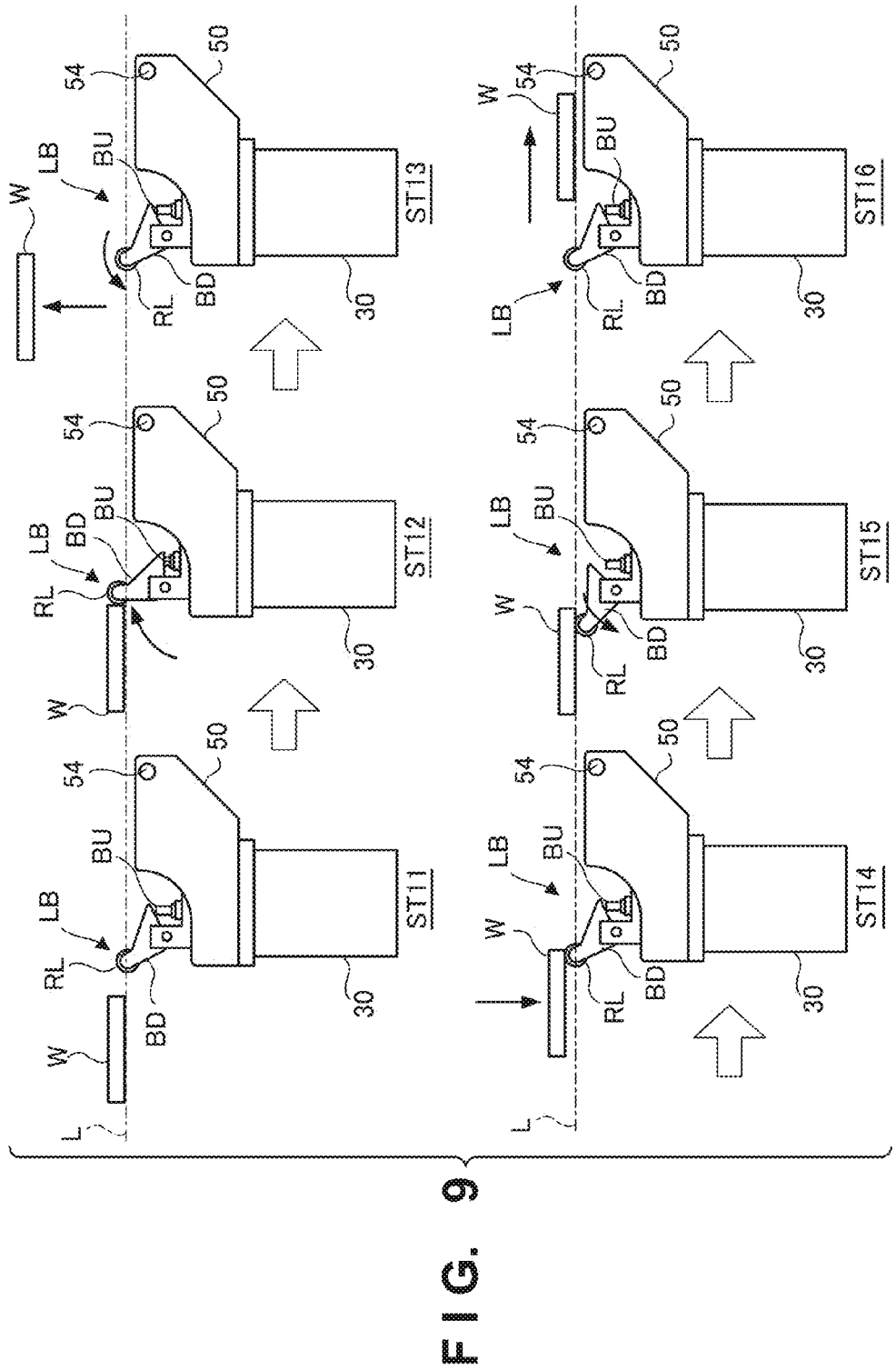
FIG. 9 is a view showing a problem when a work is stopped and then lowered.

Next, an example of the stop of the work W by the auxiliary stop unit 70 will be described. First, a situation in which the work W cannot be stopped when the auxiliary stop unit 70 is not used will be explained with reference to FIG. 9.

State ST11 and state ST12 represent the same situations as those in the state of FIG. 5 and state ST1 of FIG. 7. In these situations, the work W conveyed from the upstream side is stopped. In state ST13, the work W is raised by an elevating mechanism (not shown). The work W undergoes some processing by an apparatus that stands by above. At this time, the pressing by the work W is canceled, so the stop lever LB pivots to the upstream side in the conveyance direction by the biasing of the biasing unit BU, and returns to the same position as that in state ST11.

State ST14 represents a state in which the work W is lowered to the conveyance stop position. At this time, the roller RL has returned to the upstream side with respect to the stop position, so the work W pushes down the stop lever LB, and the roller RL further pivots to the upstream side, as represented by state ST15.

Therefore, nothing stops conveyance of the work W, and the work W is conveyed to the downstream side, as represented by state ST16.

No problem occurs when the work W is lowered and then conveyed directly. However, if the work W needs to be stopped again, it cannot be stopped. In such a case, the auxiliary stop unit 70 stops the work W.

Figure 10:
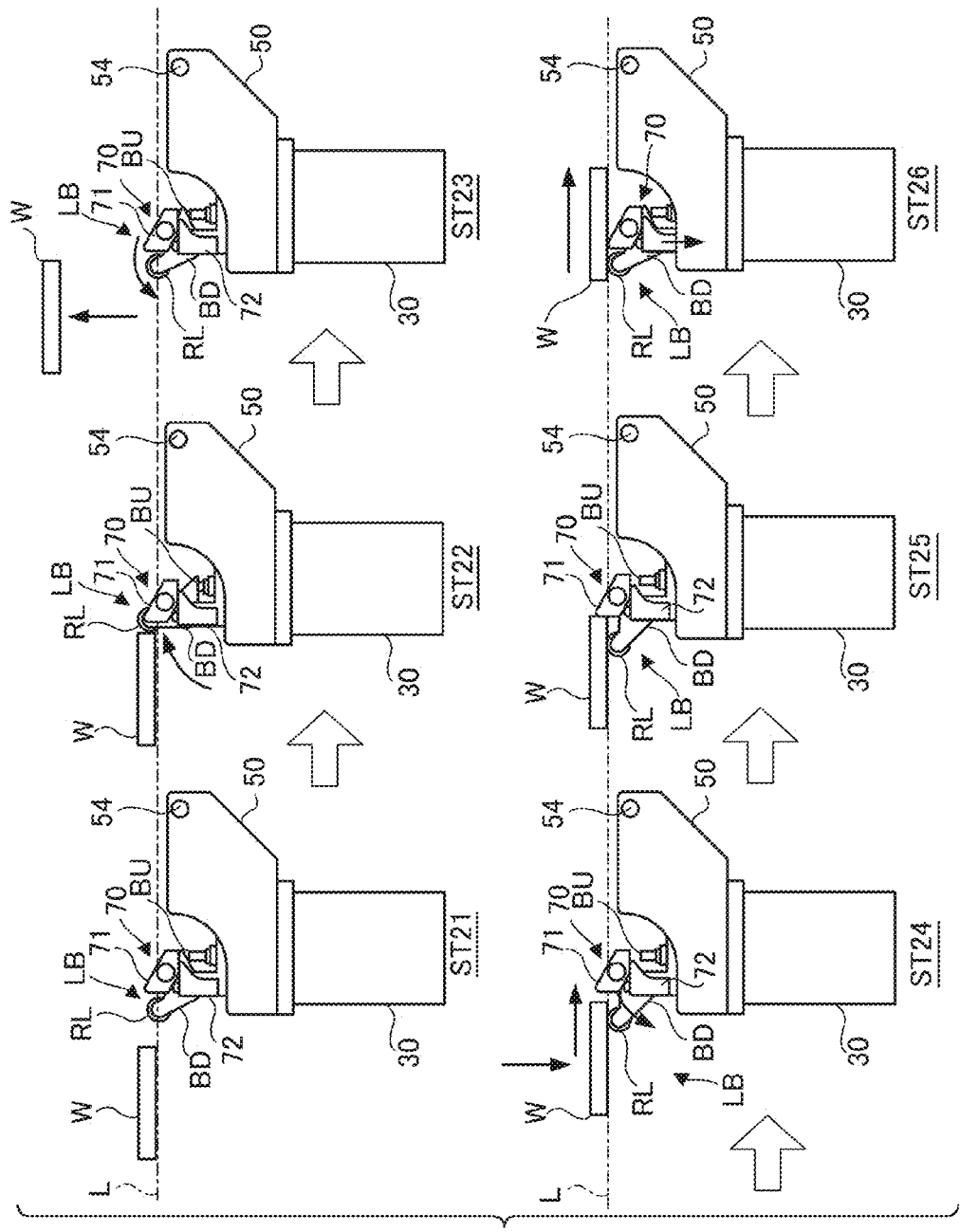
FIG. 10 is an explanatory view of the operation of the auxiliary stop unit.

FIG. 10 is an explanatory view of the operation of the auxiliary stop unit 70. State ST21 and state ST22 represent the same situations as those in state ST11 and state ST12 of FIG. 9. In these situations, the work W conveyed from the upstream side is stopped. The work W is stopped by the stop lever LB, and the auxiliary stop unit 70 does not contribute to the stop of the work W at this stage. In state ST23, the work W is raised by the elevating mechanism (not shown), as in state ST13.

At this time, similar to state ST13, the pressing by the work W is canceled, so the stop lever LB pivots to the upstream side in the conveyance direction by the biasing of the biasing unit BU, and returns to the same position as that in state ST11. However, the abutment portion 712 of the auxiliary stop unit 70 is located above the conveyance surface L.

State ST24 represents a state in which the work W is lowered to the conveyance stop position. At this time, the roller RL has returned to the upstream side with respect to the stop position, so the work W pushes down the roller RL, and the stop lever LB further pivots to the upstream side. However, since the abutment portion 712 of the auxiliary stop unit 70 is located above the conveyance surface L, the work W abuts against the abutment portion 712 and the conveyance is stopped, as represented by state ST25.

When canceling the stop of the conveyance, the movable unit 10 is displaced to the retraction position, as represented by state ST26. Then, the abutment portion 712 is retracted below the conveyance surface L, and the work W is conveyed to the downstream side.

In this fashion, according to this embodiment, when the work W is stopped, then raised, and lowered again to the stop position, conveyance of the work W can be prevented.

Note that the arrangement according to this embodiment is merely an example, and the respective components such as the movable unit 10 and the driving unit 30 can employ various arrangements. For example, as the movable unit 10, not an arrangement in which its middle portion pivots, as in this embodiment, but an arrangement in which the entire movable unit 10 integrally pivots may be adopted. Alternatively, an arrangement in which the movable unit 10 is displaced not by pivoting but by translation is also possible. As the driving unit 30, a unit that exerts a driving force in two directions, like a motor, may be used. In this case, the elastic member 33 and the regulating mechanism 20 can be sometimes omitted.

<Backward Conveyance of Work>

At the time of a test operation or the like, it is sometimes necessary to convey the work W backward (convey it from the downstream side to the upstream side). As long as the movable unit 10 is maintained at the retraction position, when the work W is conveyed backward, neither the stop lever LB nor the auxiliary stop unit 70 stops the traveling of the work W, but power is consumed. It is therefore preferable to convey the work W backward while the movable unit 10 stays at the working position.

Figure 11:
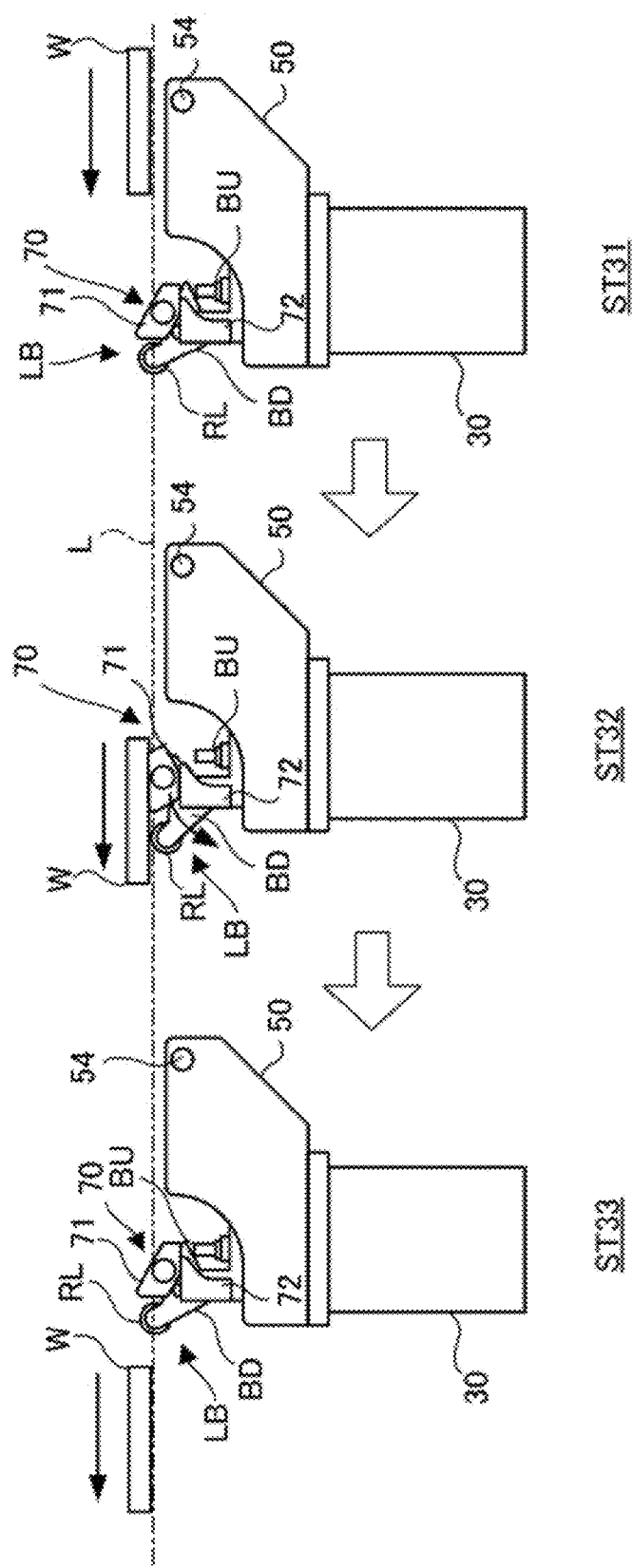
FIG. 11 is an explanatory view of an operation when a work is conveyed backward.

When the work W abuts against the stop lever LB from the downstream side, the stop lever LB pivots to the upstream side, as represented by state ST15 and state ST24, and does not stop the traveling of the work W. Also, the auxiliary stop unit 70 does not stop the traveling of the work W because the auxiliary stop lever 71 pivots to the work passage permission position in this embodiment. FIG. 11 is an explanatory view of this operation.

State ST31 represents a state in which the work W is conveyed backward from the downstream side. The movable unit 10 is located at the working position. When the work W abuts against the auxiliary stop lever 71 from the downstream side, as represented by state ST32, the auxiliary stop lever 71 first pivots to the upstream side to permit the traveling of the work W. Subsequently, when the work W abuts against the stop lever LB, the stop lever LB pivots to the upstream side to permit the traveling of the work W. When the work W completely passes through the position of the auxiliary stop lever 71, the auxiliary stop lever 71 returns to the position in state ST31 by the biasing force of the biasing unit 74. When the work W completely passes the position of the stop lever LB, the stop lever LB returns to the position in state ST31 by the biasing force of the return spring. When the work W is conveyed forward from the upstream side, it can be stopped, as represented by state ST21 and state ST22 of FIG. 10.

<Other Embodiments>

Figure 12A:
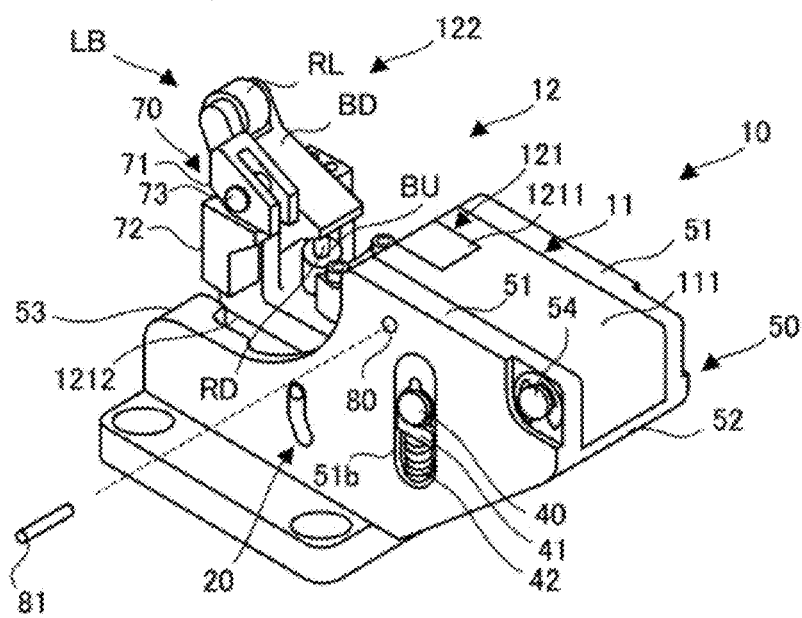
FIGS. 12A and 12B are explanatory views of an example of a mechanism that maintains the movable unit at a retraction position.
Figure 12B:
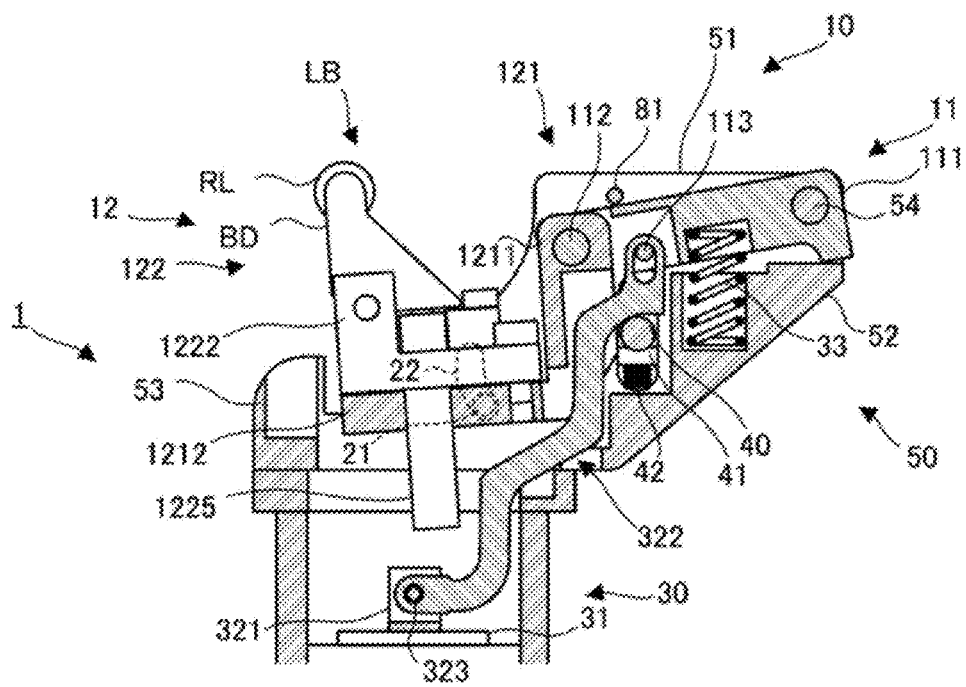

At the time of a test operation or the like, it is sometimes desirable not to stop conveyance of the. work W regardless of forward conveyance or backward conveyance. In this case, as long as the movable unit 10 is maintained at the retraction position, neither the stop lever LB nor the auxiliary stop unit 70 stops the work W, but power is consumed. Hence, a mechanism that mechanically maintains the movable unit 10 at the retraction position can also be arranged. FIGS. 12A and 12B show an example of this mechanism.

The wall portion 51 of the support unit 50 includes a mounting portion 80 to which a fixture 81 is detachably mounted. In this embodiment, the mounting portion 80 is a hole that extends through the wall portion 51 in the direction of thickness. The fixture 81 is a pin, but may have another structure. The mounting portion 80 is formed at a position that is above the movable unit 10 when the movable unit 10 is moved to the retraction position.

The movable unit 10 is moved to the retraction position, for example, manually, and the fixture 81 is inserted into the mounting portion 80. Then, as shown in FIG. 12B, the fixture 81 is located above the movable unit 10 to regulate the return of the movable unit 10 to the working position, that is, upward pivoting of the movable unit 10. In this way, it can be physically maintained to locate the movable unit 10 at the retraction position.

Figure 13A:
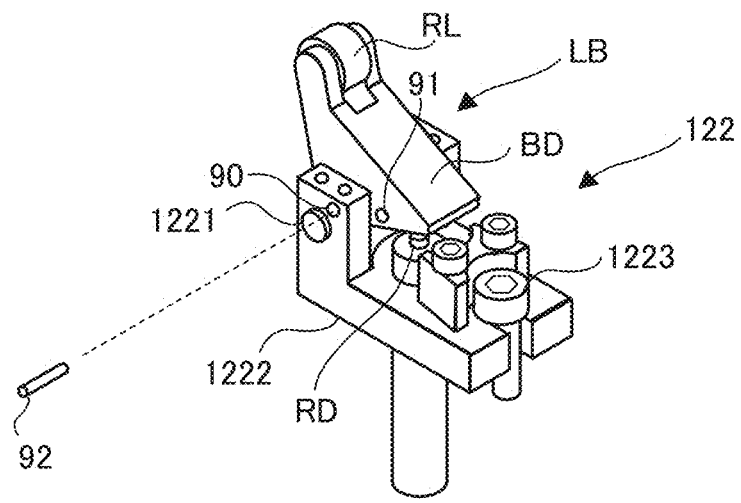
FIGS. 13A and 13B are explanatory views of an example of a mechanism that maintains a stop lever at a non-stop position.
Figure 13B:
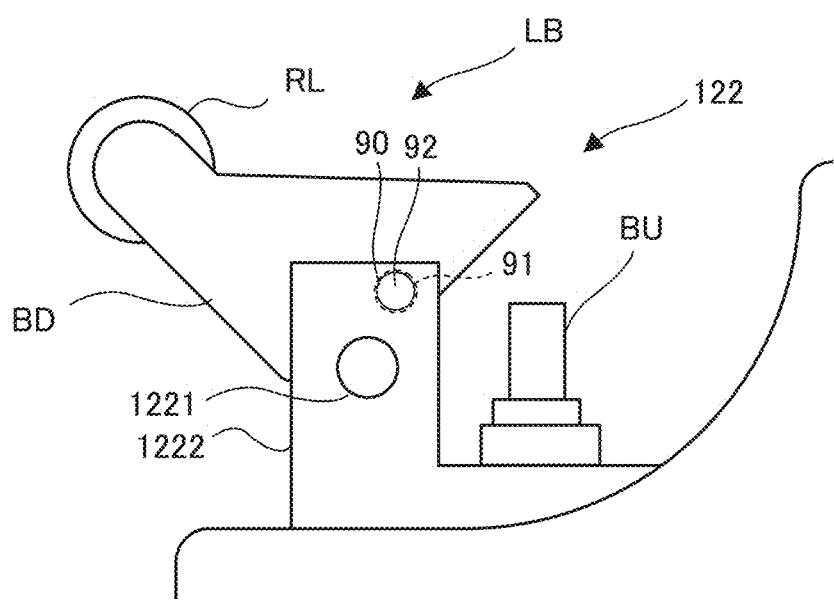

Another example of the measure when it is desirable not to stop conveyance of the work W regardless of forward conveyance or backward conveyance will be explained. Since the auxiliary stop unit 70 can be dismounted, it is dismounted from the movable unit 10. Accordingly, the traveling of the work W is not stopped by the auxiliary stop unit 70 anymore. The stop lever LB does not stop the conveyance of the work W regardless of the position of the movable unit 10 as long as the stop lever LB can be maintained at a position (to be referred to as a non-stop position) where it does not abut against the work W, as represented by state ST15 of FIG. 9 and state ST24 of FIG. 10. Thus, a mechanism that physically maintains the stop lever LB at the non-stop position can also be arranged. FIGS. 13A and 13B show an example of this mechanism.

The support member 1222 of the movable unit 10 includes a mounting portion 90 to which a fixture 92 is detachably mounted. The main body portion BD of the stop lever LB also includes a mounting portion 91 to which the fixture 92 is detachably mounted. In this embodiment, the mounting portion 90 is a hole that extends through the support member 1222 in the direction of thickness. The mounting portion 91 is a bottomed hole or a through hole. The fixture 92 is a pin. These components may have other structures.

The mounting portions 90 and 91 are formed at positions where they communicate with each other when the stop lever LB is located at the non-stop position. The stop lever LB is moved to the non-stop position, for example, manually, and the fixture 92 is inserted into the mounting portions 90 and 91, as shown in FIG. 13B. Then, the fixture 92 regulates pivoting of the stop lever LB to the downstream side in the conveyance direction of the work W, and it can be physically maintained to locate the stop lever LB at the non-stop position.

Note that the mounting portion 91 may also be omitted. For example, the position where the mounting portion 90 is formed may be adjusted so that the fixture 92 is located below the lower surface of the rear end portion of the main body portion BD.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-023728, filed Feb. 10, 2014, which is hereby incorporated by reference herein in its entirety.

What is claimed is:

1. A stop device that abuts against a work during conveyance and stops the work, comprising:
   a first stop lever configured to abut against the work during conveyance and be able to stop the work at a predetermined stop position;
   a movable unit configured to support said first stop lever so as to be able to pivot said first stop lever in a predetermined range toward a downstream side in a conveyance direction of the work;
   a first biasing unit configured to bias said first stop lever toward an upstream side in the conveyance direction;
   a driving unit configured to be able to displace said movable unit between a working position where said first stop lever can abut against the work, and a retraction position where said first stop lever cannot abut against the work;
   a support member fixed to said movable unit;
   a second stop lever pivotably supported by said support member through a horizontal shaft orthogonal to the conveyance direction; and
   a second biasing unit configured to bias said second stop lever toward the upstream side, wherein
   said second stop lever includes a first abutment surface and an inclined surface continuous with said first abutment surface,
   said support member includes a second abutment surface which abuts against said first abutment surface so as to regulate a pivot range of said second stop lever,
   said second biasing unit biases said inclined surface upward,
   when a work conveyed in the conveyance direction abuts against said second stop lever, said first abutment surface abuts against said second abutment surface so as to regulate a pivot of said second stop lever toward the downstream side, and said second stop lever stops the work conveyed in the conveyance direction at the same position as a conveyance stop position where said first stop lever stops conveyance of the work, or at a position on the downstream side in the conveyance direction from the conveyance stop position,
   when a work conveyed backward abuts against said second stop lever, said second stop lever pivots toward the upstream side against biasing of said second biasing unit so as to permit a traveling of the work conveyed backward, and
   after the work conveyed backward passes through said second stop lever, said inclined surface of said second stop lever is biased upward by said second biasing unit.

2. The device according to claim 1, wherein when the work conveyed backward passes through said second stop lever, a top of said second stop lever is positioned on a conveyance surface.

3. The device according to claim 1, wherein said movable unit includes a mounting portion to which a fixture capable of maintaining said stop lever at a position where said stop lever does not abut against the work is detachably mounted.

4. The device according to claim 1, further comprising a support unit configured to support said movable unit to be displaceable between the working position and the retraction position,
   said support unit including a mounting portion to which a fixture capable of maintaining said movable unit at the retraction position is detachably mounted.

5. An auxiliary stop unit that can be attached to a stop device which abuts against a work during conveyance and stops the work, the stop device including:
   a first stop lever configured to abut against the work during conveyance and be able to stop the work at a predetermined stop position;
   a movable unit configured to support the first stop lever so as to be able to pivot the first stop lever in a predetermined range toward a downstream side in a conveyance direction of the work;
   a first biasing unit configured to bias the first stop lever toward an upstream side in the conveyance direction; and
   a driving unit configured to be able to displace the movable unit between a working position where the first stop lever can abut against the work, and a retraction position where the first stop lever cannot abut against the work,
   wherein the auxiliary stop unit is arranged in the movable unit, and
   the auxiliary stop unit comprises:
   a support member fixed to the movable unit;
   a second stop lever pivotably supported by said support member through a horizontal shaft orthogonal to the conveyance direction; and
   a second biasing unit configured to bias said second stop lever toward the upstream side,
   said second stop lever includes:
   a work abutment portion at the same position as a conveyance stop position where the first stop lever stops conveyance of the work, or at a position on the downstream side in the conveyance direction from the conveyance stop position,
   a first abutment surface, and
   an inclined surface continuous with said first abutment surface,
   said support member includes a second abutment surface which abuts against said first abutment surface so as to regulate a pivot range of said second stop lever,
   said second biasing unit biases said inclined surface upward,
   when a work conveyed in the conveyance direction abuts against said second stop lever, said first abutment surface abuts against said second abutment surface so as to regulate a pivot of said second stop lever toward the downstream side, and said second stop lever stops the work conveyed in the conveyance direction at the conveyance stop position or at the position on the downstream side in the conveyance direction from the conveyance stop position,
   when a work conveyed backward abuts against said second stop lever, said second stop lever pivots toward the upstream side against biasing of said second biasing unit so as to permit a traveling of the work conveyed backward, and
   after the work conveyed backward passes through said second stop lever, said inclined surface of said second stop lever is biased upward by said second biasing unit.

* * * * *